(12) United States Patent
Welter

(10) Patent No.: US 7,540,552 B2
(45) Date of Patent: Jun. 2, 2009

(54) APPARATUS FOR ARRANGING CABLES IN A VEHICLE

(75) Inventor: Patrick Welter, Lachambre (FR)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 356 days.

(21) Appl. No.: 10/584,794

(22) PCT Filed: Dec. 9, 2004

(86) PCT No.: PCT/EP2004/014012

§ 371 (c)(1),
(2), (4) Date: Jun. 28, 2006

(87) PCT Pub. No.: WO2005/067115

PCT Pub. Date: Jul. 21, 2005

(65) Prior Publication Data

US 2007/0132267 A1    Jun. 14, 2007

(30) Foreign Application Priority Data

Jan. 5, 2004    (DE) .................. 10 2004 001 186

(51) Int. Cl.
*B60J 3/00* (2006.01)

(52) U.S. Cl. .................................................... 296/97.1
(58) Field of Classification Search ............ 296/97.1, 296/97.2, 97.3, 97.5, 97.9, 97.12, 97.13
See application file for complete search history.

(56) References Cited

U.S. PATENT DOCUMENTS

| 4,174,864 | A | * | 11/1979 | Viertel et al. | .............. 296/97.5 |
| 5,203,623 | A | * | 4/1993 | Viertel et al. | .............. 296/97.2 |
| 5,320,399 | A | * | 6/1994 | White et al. | ............. 296/97.12 |

FOREIGN PATENT DOCUMENTS

| DE | 9306219 U1 | 6/1993 |
| JP | 2003/164033 | 6/2003 |

OTHER PUBLICATIONS

English Translation of the PCT International Preliminary Examination Report; date of mailing Oct. 26, 2006 (8 pages).
German International Search Report for PCT/EP2004/014012, date of mailing Apr. 26, 2005, 2 pages.

* cited by examiner

*Primary Examiner*—Lori L Lyjak
(74) *Attorney, Agent, or Firm*—Foley & Lardner LLP

(57) ABSTRACT

A guide device for a component of a motor vehicle, such as a sun visor, is used to move at least one cable to a connector in the visor. The guide device includes a cable guide having a ramp for displacing the, cable toward the connector.

20 Claims, 3 Drawing Sheets

APPARATUS FOR ARRANGING CABLES IN A VEHICLE

CROSS REFERENCE TO RELATED APPLICATIONS

The present Application claims the benefit of priority to the following International Application: PCT Patent Application No. PCT/EP2004/014012 titled "Device For Moving At Least One Cable, In Particular In A Component Of A Vehicle, A Sun Visor Provided With A Moving Device And Method For Moving A Cable" filed on Dec. 9, 2004, which claims priority to German Patent Application No. DE 102004001186.9 filed on Jan. 5, 2004 (which are both incorporated by reference in their entirety).

FIELD

The present invention relates to an apparatus, in particular for a component of a vehicle, for example a sun visor, for laying at least one cable.

BACKGROUND

Expenditure on cabling in vehicles is typically very high on account of the wide variety of equipment in vehicles. For example, vehicles are often fitted with comfort components with which the journey can be made as comfortable as possible both for the driver and also for passengers. Many equipment components require an electrical connection, and this is complicated in terms of production, and often has to be carried out manually on account of the restricted amount of space, and is therefore usually expensive.

On account of the small amount of space available in vehicles, it would be desirable that this space should be utilized in an optimum manner.

One object of the present invention is therefore to provide a cost-effective apparatus for cabling components, in particular for a vehicle, which is simple to produce, easy to mount, saves space and with which it is possible to lay the cables in a simple and largely automated manner.

SUMMARY

The object is achieved by an apparatus, in particular for a component of a vehicle, for laying at least one cable, wherein the apparatus comprises a guide, and wherein the cable can be moved to a connector by the guide. The guide makes it easier to lay the cable to the connector, so that the cable can be laid in a quick, simple and therefore cost-effective manner.

The apparatus preferably comprises a transfer device which is particularly preferably substantially in the form of a funnel. The cable is passed to the guide through the transfer device. The funnel shape permits the cable to be inserted easily into the transfer device and positioned precisely on the guide.

In one preferred embodiment of the invention, the apparatus comprises the connector, so that it is possible to install the apparatus into the components as one assembly. The apparatus can therefore be mounted in a quick and cost-effective manner.

The transfer device preferably has an inlet opening and an outlet opening, wherein the cable can be laid from the inlet opening to the outlet opening, and wherein the cross section of the outlet opening in the laying direction of the cable is approximately the same size as or slightly larger than the sum of the cross sections of all of the cables which are passed through the transfer device. The cables therefore rest substantially against one another at the outlet opening which is large enough to allow all of the cables to easily pass through.

The cross section of the inlet opening in the laying direction of the cable is preferably at least twice the size of the cross section of the outlet opening, so that the cable can be easily inserted at the inlet opening of the transfer device.

In one preferred embodiment, a plurality of cables are provided next to one another at the outlet opening, particularly preferably substantially in one plane, so that they can enter the guide individually and can from there be passed to the connectors individually.

The transfer device is preferably made of plastic, however, any material which is light and easily deformable is suitable.

In one preferred embodiment, the guide has at least one substantially elongate cable guide with at least one substantially L-shaped surface profile and/or at least one substantially U-shaped surface profile transverse to the laying direction of the cable, on which surface profile the cable rests. This ensures that the cable is passed in or along the cable guide without slipping away, and that it is not passed to locations at which the connector can no longer make effective contact with it.

The guide preferably has one cable guide for each cable, with a plurality of cable guides being arranged next to one another, so that each cable is passed to the connector individually and the cables do not become entangled with one another.

The guide preferably has a ramp for deflecting a plurality of cables from an inlet plane, in which the cables enter the guide, into an outlet plane, in which the cables leave the guide. The cables are preferably stiff, so that they at least substantially maintain their laying direction when they leave the guide. The cables are therefore deflected such that they can be positioned advantageously on and/or in the connector, for example above the connector. In order for the connector to make contact with the cables, said cables are at least partially bent back in the direction of the inlet plane of the cables into the guide on that side of the guide on which they leave said guide. Therefore, when subjected to a tensile load which acts on at least one of the cables in the direction opposite the laying direction, the cable is supported at an edge or at a support point which is located at the outer corner of the ramp on the guide in the outlet plane of the cable. The guide therefore assumes the function of a strain-relief device for the cables.

The plurality of cables are preferably present at the outlet opening of the transfer device in the inlet plane of the guide, so that the cables can slide from the transfer device into the guide without being left hanging.

In the laying direction of the cables, the cable guides are preferably at least partly bent such that adjacent cables are parallel to one another and rest substantially against one another in the inlet plane, whereas they are spaced apart from one another in the outlet plane. This creates the distance between the cables which is required at the connector.

The connectors are preferably in the form of a pressure-connection terminal, in particular an insulation-displacement terminal. The use of a pressure-connection terminal means that the cable can be connected quickly and easily. Expenditure on stripping before contact is made can be saved by using an insulation-displacement terminal. However, any connector which secures the position of the cable and which can be used to reliably contact-connect the cable to the electronic/electrical system can be used, for example even screw terminals. Further, connectors with which expenditure on stripping the cable can be saved are preferably used. This also has the advantage that the cables (not stripped) can be laid more effectively, in particular in the transfer device and/or in the guide.

In one preferred embodiment, the apparatus is produced integrally, so that expenditure on mounting a plurality of components of the apparatus is minimized or avoided. The apparatus can therefore be used in a particularly cost-effective manner in this embodiment.

The apparatus for laying at least one cable makes it possible to lay cables in or for components, in particular in vehicles, in a simple, quick and cost-effective manner. The apparatus can be produced in a cost-effective and simple manner and can be mounted easily.

The present invention also relates to a sun visor, in particular for a vehicle, which has an inventive apparatus for laying at least one cable, for making it possible to connect cables in the sun visor in a simple, quick and cost-effective manner.

The present invention also relates to a method for laying a cable, in particular for connecting components of vehicles, having an apparatus according to the invention, wherein the cable is laid to the connector by means of the apparatus and contact is then made between the cable and the connector. This means it is possible to lay the cable simply and quickly.

The cable is preferably laid to the connector by machine. In this case, the cable is pushed through the transfer device to the guide and along the guide to the connector, and there positioned such that it is easy to make contact with said cable. This means that working time can be saved, as a result of which the production costs are reduced.

The connector is preferably at least one pressure-connection terminal, in particular an insulation-displacement terminal, wherein the cable is laid up to a point above the pressure-connection terminal, wherein the cable is pressed into the pressure-connection terminal by a force which acts on the cable, and wherein contact is made with the cable in the process. This can be achieved easily and quickly and, in particular, also by machine.

The method according to the invention makes it possible to lay cables, in particular in or for connecting components of vehicles, in a simple and quick manner and largely by machine. Said method can also be carried out in a cost-effective manner.

BRIEF DESCRIPTION OF THE FIGURES

The invention is described below with reference to FIGS. 1-4. The descriptions are merely exemplary and do not restrict the general concept of the invention.

DETAILED DESCRIPTION

Figure 1:
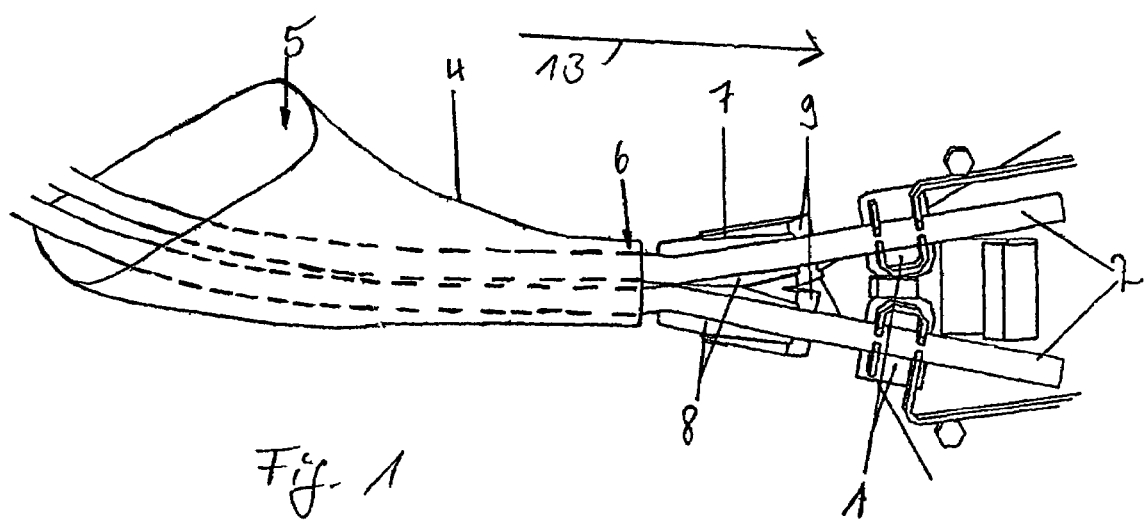
FIG. 1 shows one embodiment of the apparatus according to the invention.

FIG. 1 illustrates one embodiment of the inventive apparatus for laying at least one cable 2. The apparatus is suitable for laying two or more cables 2. It has a transfer device 4 which is shown substantially in the form of a funnel (and made from plastic according to one embodiment). The transfer device 4 has an inlet opening 5 which is larger than the outlet opening 6, with the two cables 2 leaving the outlet opening 6 such that they are arranged next to one another and in one plane. The plane in which the cables 2 leave the outlet opening 6 of the transfer device 4 is the same as an inlet plane (illustrated in FIG. 2 and FIG. 3) in which they enter a guide 7. The guide 7 has a cable guide 8 for each of the two illustrated cables 2, along which cable guide 8 the cables 2 are passed when they are being pushed through, and also a ramp 9 with which the cables 2 are deflected out of their inlet plane, in particular upward, so that they are positioned above the connector 1. The connector 1 used here is two insulation-displacement terminals 1, so that, after being pushed through, in each case one of the cables 2 is positioned above a respective one of the insulation-displacement terminals 1 and can be pressed into the latter. Contact is made with the cables 2 in the process. The terms connector 1 and insulation-displacement terminal 1 are used synonymously in the following text. Furthermore, an embodiment is also possible in which a plurality of cables 2, for example two cables 2, are deflected by the guide 7 such that they leave the guide 7 such that they are arranged one above the other, and are positioned above an insulation-displacement terminal 1 such that they are arranged one above the other. The cables 2 can then be pressed into the insulation-displacement terminal 1 together.

Figure 2:
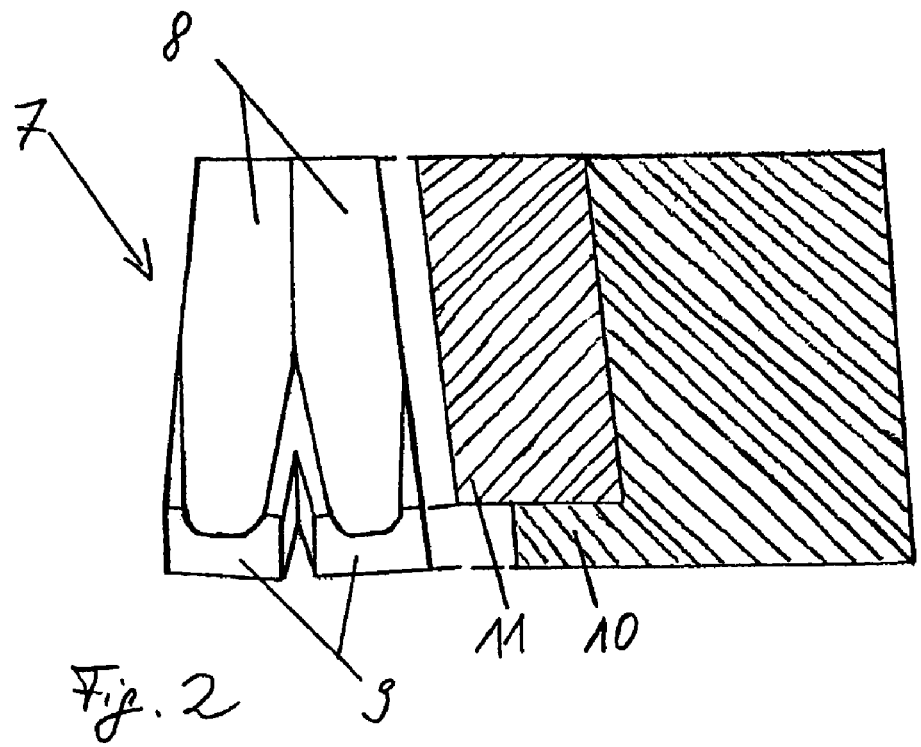
FIG. 2 shows one embodiment of a guide according to the invention.

FIG. 2 shows a guide 7 for cables 2, in particular for two cables 2, which has two cable guides 8 and a ramp 9, so that the cables 2 enter the guide 7 in the inlet plane 10 and leave the guide 7 in an outlet plane 11.

Figure 3:
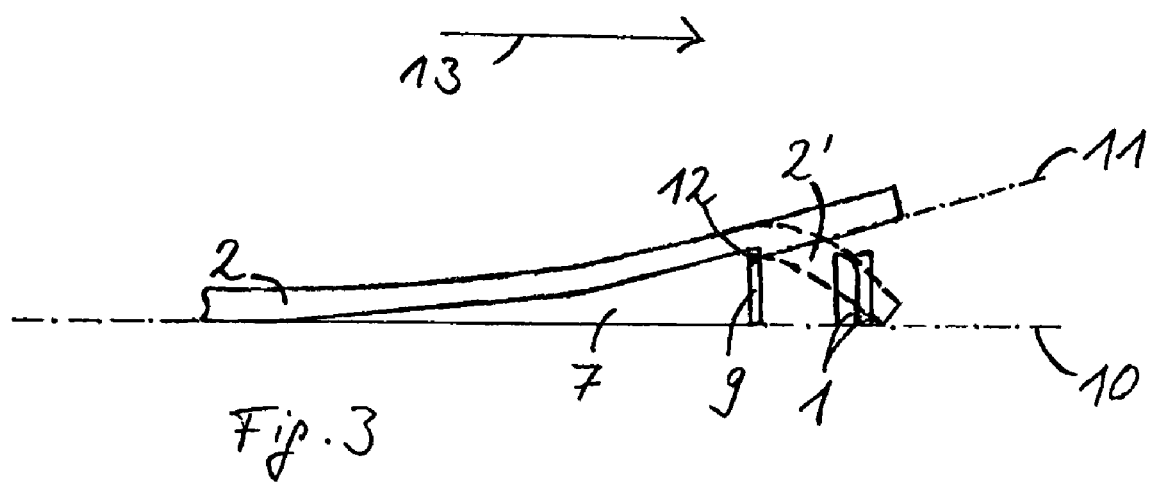
FIG. 3 shows a side view of the guide from FIG. 2.

FIG. 3 shows a side view of the guide 7 from FIG. 2 in order to illustrate the ramp 9. FIG. 3 shows the profile of a cable 2 in the guide 7. The cable 2 enters the guide 7 in the inlet plane 10, is deflected by the ramp 9, and leaves the guide 7 in the outlet plane 11. After leaving the guide 7, said cable initially at least substantially maintains the direction of the outlet plane 11 in which it has been deflected by the guide 7. When contact is made, in this case for example by pressing the cable 2 into the connector 1 or into an insulation-displacement terminal 1, the cable 2 is bent back at least partially in the direction of the inlet plane 10 of the cable 2 into the guide 7. As a result, a contact-connected cable 2' can be supported at a support point 12 when subjected to a tensile load in the direction opposite the laying direction 13, so that the ramp 9 of the guide 7 acts as a strain-relief device for the cable 2. The support point 12 is particularly in the form of an edge.

Figure 4:
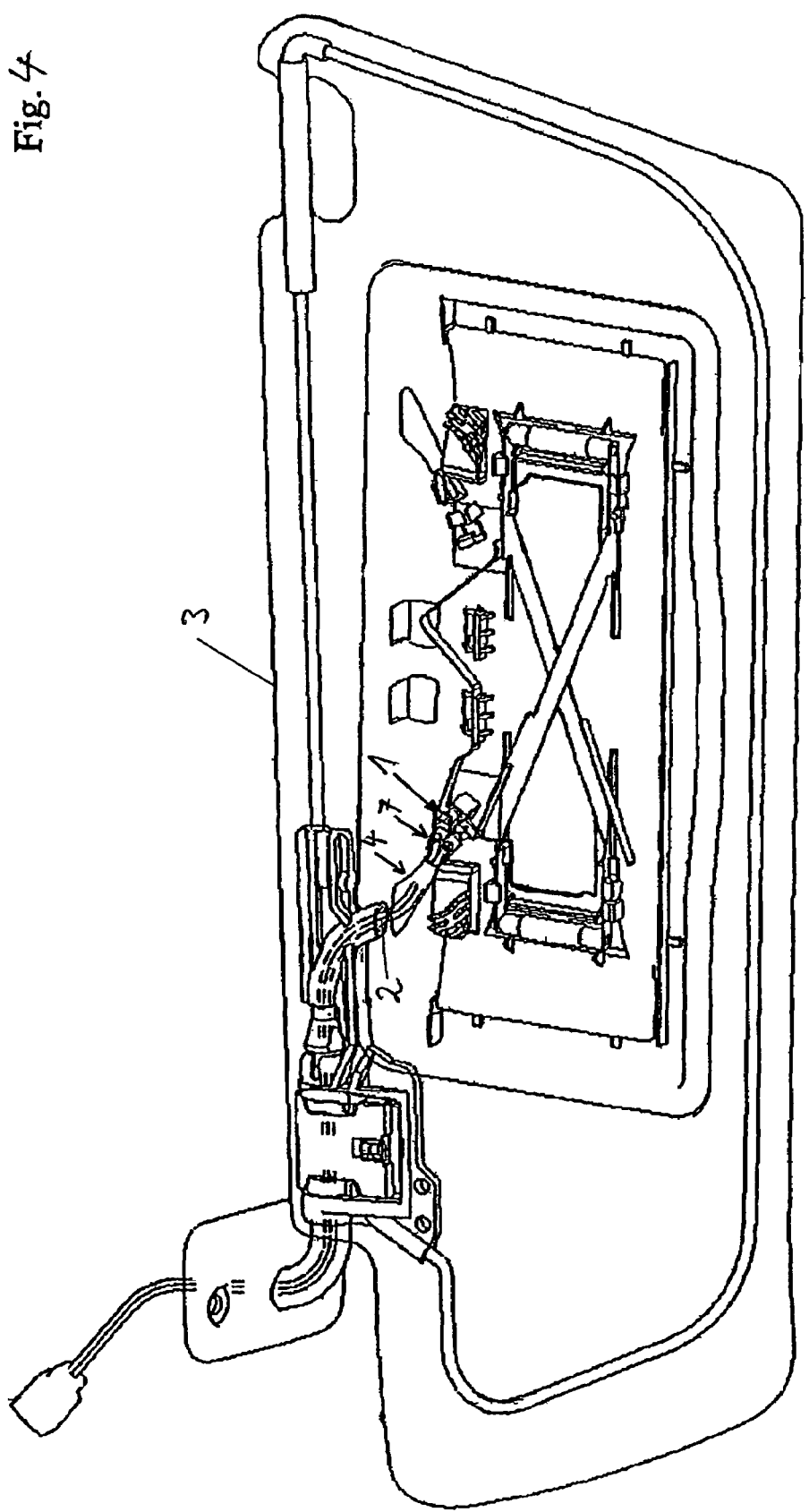
FIG. 4 shows a sun visor with an apparatus according to one embodiment of the invention.

FIG. 4 illustrates a sun visor 3 as an example of a vehicle component which comprises the inventive apparatus for laying at least one cable 2. FIG. 4 shows the connection of cables 2 of the sun visor 3. The cables 2 are pushed through the transfer device 4, passed along the respective cable guide 8 of the guide 7 over the connector 1, here insulation-displacement terminals, and then pressed into the insulation-displacement terminals 1, where they are contact-connected.

The inventive apparatus and the inventive method can be used or employed in a large number of different components, in particular of vehicles, preferably electrically connected components, for example in sun visors 3, in the cockpit or in vehicle doors.

The invention claimed is:

1. An apparatus for a component of a vehicle, for laying at least one cable, comprising: a guide, wherein the cable can be moved to a connector by the guide; and a transfer device which is substantially in the form of a funnel, the transfer device having an inlet opening and an outlet opening, so that the cable can be laid from the inlet opening to the outlet opening in a laying direction, and wherein the cross section of the outlet opening in the laying direction of the cable is approximately the same size as or slightly larger than the sum of the cross sections of all of the cables which are passed through the transfer device, wherein the cross section of the inlet opening in the laying direction of the cable is at least twice the size of the cross section of the outlet opening.

2. The apparatus as claimed in claim 1, wherein the apparatus comprises the connector.

3. The apparatus as claimed in claim 2, wherein the connector is a pressure-connection terminal.

4. The apparatus as claimed in claim 1 wherein a plurality of cables are provided next to one another at the outlet opening substantially in one plane.

5. An apparatus for a component of a vehicle, for laying at least one cable, comprising: a guide, wherein the cable can be moved to a connector by the guide; and a transfer device which is substantially in the form of a funnel wherein the transfer device is made of a plastic material.

6. The apparatus as claimed in claim 5, wherein the transfer device has an inlet opening and an outlet opening, so that the cable can be laid from the inlet opening to the outlet opening in a laying direction, and wherein the cross section of the outlet opening in the laying direction of the cable is approximately the same size as or slightly larger than the sum of the cross sections of all of the cables which are passed through the transfer device.

7. A sun visor for a vehicle comprising the apparatus of claim 5.

8. An apparatus for a component of a vehicle, for laying at least one cable in a laying direction, comprising: a guide, wherein the cable can be moved to a connector by the guide, wherein the guide comprises at least one substantially elongate cable guide with at least one substantially L-shaped surface profile and at least one substantially U-shaped surface profile transverse to the laying direction.

9. The apparatus as claimed in claim 8, wherein the guide includes one cable guide for each cable, with a plurality of cable guides being arranged next to one another.

10. The apparatus as claimed in claim 8, wherein the apparatus comprises a transfer device which is substantially in the form of a funnel.

11. The apparatus as claimed in claim 10, wherein the guide and the transfer device are integrally formed.

12. An apparatus for a component of a vehicle, for laying at least one cable, comprising: a guide, wherein the cable can be moved to a connector by the guide, wherein the guide comprises a ramp configured to deflect a plurality of cables from an inlet plane, in which the cables enter the guide, into an outlet plane, in which the cables exit the guide.

13. The apparatus as claimed in claim 12, further comprising a transfer device having an inlet opening and an outlet opening, wherein the plurality of cables are present at the outlet opening of the transfer device in the inlet plane of the guide.

14. The apparatus as claimed in claim 12, wherein the cable guide is at least partly bent such that adjacent cables are parallel to one another and rest substantially against one another in the inlet plane, whereas they are spaced apart from one another in the outlet plane.

15. A method for laying a cable for connecting components of vehicles, comprising: providing an apparatus having a transfer device with an inlet opening configured to receive the cable, and an outlet opening to direct the cable to a guide, the guide comprising a ramp configured to deflect the cable from an inlet plane, in which the cable enters the guide, into an outlet plane, in which the cable exits the guide;

pushing the cable through the transfer device and the guide so that the cable enters the guide in the inlet plane and exits the guide in the outlet plane; and making contact between the cable and a connector, the connector disposed adjacent an exit of the guide.

16. The method as claimed in claim 15, wherein the cable makes contact with the connector by use of a machine.

17. The method as claimed in claim 15, wherein the connector comprises at least one pressure-connection terminal, and further comprising the step of positioning the cable above the pressure-connection terminal.

18. The method as claimed in claim 17, further comprising the step of pressing the cable into the pressure-connection terminal by a force acting on the cable.

19. The method as claimed in claim 17, wherein the pressure-connection terminal comprises an insulation-displacement terminal.

20. A sun visor for a vehicle comprising the apparatus of claim 1.

* * * * *